United States Patent

Shubinsky

[11] Patent Number: 5,551,548
[45] Date of Patent: Sep. 3, 1996

[54] CLUTCH ASSEMBLY FOR AN OFF-HIGHWAY TRANSMISSION

[75] Inventor: Vladimir D. Shubinsky, Northbrook, Ill.

[73] Assignee: Case Corporation, Racine, Wis.

[21] Appl. No.: 493,007

[22] Filed: Jun. 21, 1995

[51] Int. Cl.$^6$ .................................................. F16D 25/061
[52] U.S. Cl. .......................................................... 192/106 F
[58] Field of Search ............................ 192/106 F, 85 AA

[56] References Cited

U.S. PATENT DOCUMENTS

| | | | |
|---|---|---|---|
| 4,947,974 | 8/1990 | Smemo et al. | 192/106 F |
| 4,957,195 | 9/1990 | Kano et al. | 192/106 F |
| 5,172,799 | 12/1992 | Iijima et al. | 192/106 F |
| 5,439,088 | 8/1995 | Michioka et al. | 192/106 F |

*Primary Examiner*—Dirk Wright
*Attorney, Agent, or Firm*—Rudnick & Wolfe

[57] ABSTRACT

A clutch assembly for selectively transferring rotary power between axially aligned drive and driven members arranged about a transmission shaft of off-highway equipment such as a tractor or the like. The clutch assembly includes an actuator assembly arranged in operable combination with a clutch pack of interleaved annular clutch plates. The actuator assembly includes a clutch piston arranged in operable combination with and establishing an expandable fluid receiving pocket with the drive member. The clutch assembly further includes an annular ring disposed in sealing engagement with and between the clutch piston and the drive member. As long as the clutch piston is in a released position, the annular ring operably divides the piston cavity into inner and outer annular cavities disposed at different radial distances from the axis of the shaft. The clutch assembly further includes a fluid conduit for delivering pressurized fluid to the piston cavity and that opens to the inner chamber of the piston cavity or pocket.

32 Claims, 3 Drawing Sheets

CLUTCH ASSEMBLY FOR AN OFF-HIGHWAY TRANSMISSION

FIELD OF THE INVENTION

The present invention generally relates to transmissions for off-highway equipment and, more particularly, to an improved clutch assembly for an off-highway equipment transmission.

BACKGROUND OF THE INVENTION

The prior art is replete with various types of transmissions for off-highway equipment such as tractors and the like. Transmissions for off-highway equipment usually include a casing having a plurality of selectively operable gear meshes that transmit power and torque through various delivery paths between input and output shafts of the transmission. More modern transmissions include two or more constantly intermeshing gears in each gear mesh for developing different speed ratios between the input and output shafts of the transmissions. Some transmissions for off-highway equipment or implements have both a multi-speed transmission section and multi-range transmission section for offering a multitude of various gear ratios capable of developing different ground speeds for the off-highway equipment.

Various gear meshes in the transmission are used to allow the engine to operate so that its output torque follows as closely as possible the maximum power characteristics at the desired ground speed of the implement. In doing so, the transmission varies torque as well as rotational speeds between the input and output shafts. With off-highway equipment, and primarily because of the relatively high draft loads placed on the equipment as they operate in a field, the differences between various gear ratios is relatively small. Thus, the transmission can be conditioned to allow the engine to operate at an optimum speed for different ground speeds of the tractor. Because of the relatively small changes between gear ratios, it is not unusual for an operator to "skip" shifts during the field operation. Under optimum conditions, there is little or no interruption in power during shifting, which contributes greatly to driving comfort, especially when the off-highway equipment is working under a heavy load. To accomplish the goal of little or no interruption in power during shifting, the time required to shift between gear ratios must remain consistent regardless of when the operator decides to shift.

Shifting of a transmission for a tractor and the like is typically carded out by selectively changing which gear meshes in the transmission are coupled to each other as through controlled engagement and disengagement of a series of clutch assemblies. Each clutch assembly in the transmission is operably connected between drive and driven members. Typically, the drive member comprises a gear arranged for rotational movement with a rotatably driven shaft in the transmission and forming part of a first gear mesh. In such an arrangement, the driven member similarly comprises a gear arranged for relative rotation about the shaft on which the drive gear is mounted and forms part of a second gear mesh in the transmission. In one form of the invention, the drive gear may furthermore comprise a clutch housing that rotates with the drive gear.

All transmission clutches further include a common element essential for their functional operation—a piston. The piston is arranged in operable combination with the drive gear and/or the clutch housing to establish an expandable fluid receiving piston cavity or pocket. A typical clutch assembly further includes a clutch pack comprised of a series of interleaved annular friction plates arranged about the rotating shaft and between the drive and driven gears. Some of the annular plates (friction plates) of the clutch pack turn or rotate with the drive member of the clutch assembly while other annular plates (separators) of the clutch pack turn or rotate with the driven member of the clutch assembly. As is conventional, and under the influence of the introduction of fluid into the piston cavity, the clutch piston applies an adequate compressive force against the friction clutch plates such that power and torque are transmitted between the drive and driven members of the clutch assembly. When the clutch assembly is to be released, the flow of pressurized fluid to the piston cavity or pocket is stopped and the clutch piston returns to its released position typically under the influence of a spring.

Pressurized fluid is supplied to the piston cavity through a suitable conduit. The conduit for delivering fluid to the piston cavity or pocket can take many configurations. In many instances, the shaft about which the drive and driven members of the clutch assembly are axially arranged is typically provided with an axially elongated bore that opens to the fluid receiving piston cavity or pocket. A control valve connected to a suitable source of pressurized fluid, such as a pump on the off-highway equipment, controls fluid flow through the conduit and, thus, controls operation of the transmission clutch assembly.

Because of the constant intermeshing relationship between the gears of the gear meshes, or as a result of their positioning within the transmission, clutch assemblies often see "reflected" rotations. That is, although a particular clutch assembly may not be specifically conditioned to establish a drive connection between the drive and driven members, the drive member or gear of the clutch assembly may nevertheless rotate at relatively high speeds. These rotations of the drive gear or drive member, especially at high speeds, can result in inadvertent self-engagement of the clutch assembly as a result of residual centrifugal pressure or centrifugal head force in the piston cavity. As will appreciated by those skilled in the art, inadvertent serf-engagement of the clutch assembly is detrimental to the transmission's logic.

The presence of residual fluid in the piston cavity, the geometrical size of the piston, the speed of rotation of the driven member or gear are all variables which affect the magnitude of the centrifugal head force applied to the piston of the clutch assembly. With increasing speed of rotation of the drive member, the centrifugal head force applied to the clutch piston can be of such magnitude whereby the centrifugal head force overcomes the spring return force and results in inadvertent self-energization of the clutch assembly. As will be appreciated, a supposedly released clutch assembly in the transmission, that becomes serf-engaged will have adverse affects on the logic of the transmission and overall transmission performance. As known, self-energization of the clutch assembly commonly results in increased wear of the clutch plates, significant heat build-up between slipping clutch plates, contamination of the hydraulic fluid, and eventual destruction of the clutch assembly.

Various approaches have been proffered to inhibit the problem associated with centrifugal head force build-up in the piston cavity. One approach to solving serf-energization of the clutch assembly resulting from centrifugal head force involves providing an orifice through a piston wall to allow constant discharge of residual fluid from the piston cavity as long as the piston remains in a released position. The orifice is typically arranged such that a friction plate or reaction member of the clutch pack seals the orifice when the piston of the clutch assembly applies a compressive force to the clutch pack of the clutch assembly. As will be appreciated, and with the piston in a released position, residual fluid flow from the piston cavity through the piston increases proportionately as a function of the rotatable speed of the drive member.

Another approach at reducing the effects of centrifugal head force on the clutch assembly piston that can result in self-energization of the clutch assembly involves installing valve structure in combination with the clutch assembly piston. Like the orifice discussed above, the purpose of the valve structure is to affect the discharge of fluid from the piston cavity as long as the clutch assembly piston is in a released position, thus inhibiting inadvertent application of the clutch assembly.

Various types of valve structures have been proposed for use with the clutch assembly piston. Valves having spring loaded balls are known in the art for controlling the discharge of hydraulic fluid from the piston cavity as long as the clutch piston remains in a released position. Also, valve structures with housings having conically angled ramps on which a variably weighted ball rides are known in the art. In the later version, the size of the ball and the angle Of the ramp are calculated and selected according to the specific needs of a given clutch assembly application. When the piston cavity is pressurized, the ball of the valve structure seals the piston cavity thus making clutch energization short and efficient.

Heretofore known devices for dissipating centrifugal head force in a piston cavity of a clutch assembly also have certain drawbacks. The size of the opening in the piston, and/or the size of the detent or ball comprising part of such heretofore known valve structures, are relatively small. Accordingly, contaminants commonly found in the transmission fluid often block the orifice or interfere with proper operation of the valve structure and, therefore, the problems of self-energization of the clutch assembly remains a serious concern.

As an operator drives the equipment across a field, and because the change effected between consecutive gear ratios of off-highway equipment is relatively small, the transmission typically remains in a constant condition. As such, the drive members operably associated with various non-engaged clutch assemblies continue to rotate at relatively high rotational speeds. As mentioned, the heretofore known devices for dissipating centrifugal head force in the various piston chambers of the non-engaged clutches allow residual fluid to be discharged from the piston chamber to inhibit self-energization of the clutch assembly.

Although no fluid flow is specifically directed to the non-engaged clutch assemblies, upon disengagement of the clutch assembly residual fluid normally remains in the conduit or passage leading to the piston cavity. The heretofore known devices for dissipating centrifugal head force in the piston cavity are known to drain not only the piston cavity of the non-engaged clutch assembly, they furthermore drain residual fluid from the supply conduit leading to the piston cavity thus leaving an "air space" in the fluid supply conduit or line. Thus, when a non-engaged clutch assembly is eventually engaged, pressurized fluid must travel through and initially fill a drained supply line or conduit before the pressurized fluid is presented to and fills the piston cavity of the to-be-engaged clutch assembly. The need to fill both the supply line and the piston cavity with pressurized fluid leads to unpredictability of clutch performance.

Because of the variables involved, for example, the speed of rotation of the driven member or gear operably coupled to the clutch assembly, the time when the operator decides to shift or change conditions of the transmission, and the temperature condition of the hydraulic transmission fluid, it is nearly impossible to predict the "fill" status of various supply conduits and piston cavities prior to and during a transmission shift. Consequently, each shift or change in transmission condition will be different thus degrading shift quality while adversely effecting power transfer, especially under heavy draft load conditions, for the implement thereby affecting driving comfort for the operator.

Thus, there is a need and a desire for a transmission clutch assembly including structure for eliminating centrifugal head force in a non-engaged clutch while affording substantially constant shift times regardless of when the operator decides to shift or change the condition of the transmission.

SUMMARY OF THE INVENTION

In view of the above, and in accordance with the foregoing, there is provided a transmission clutch assembly for transferring power between axially aligned drive and driven members arranged about a rotatable shaft of off-highway equipment such as tractors and the like. The clutch assembly of the present invention includes an actuator assembly arranged in operable combination with a clutch pack of interleaved friction members for transferring rotary power between the drive and driven members in response to the actuator assembly applying a compressive force upon the clutch pack. The actuator assembly includes a piston arranged in operable combination with and establishing a fluid receiving pocket with the drive member. The piston is axially movable from a released position toward the clutch pack in response to the creation of fluid pressure in the pocket thereby conditioning the clutch pack to establish the drive connection between the drive and driven members. A salient feature of the present invention relates to an annular ring that is disposed between the piston and the drive member for operably dividing the pocket or piston cavity into inner and outer chambers that are disposed at different radial distances from a common axis about which both the drive and driven members rotate. Opposite edges of the ring are arranged in fluid tight sealing relation with the piston and drive member thereby maintaining the chambers in separate relation relative to each other as long as the piston is in the released position.

A fluid conduit is provided for selectively directing pressurized fluid to the piston cavity or pocket. In a most preferred form of the invention, the fluid conduit is defined as an axially elongated bore provided in the shaft about which the drive and driven members rotate. Moreover, the fluid conduit opens to the inner chamber of the piston cavity or pocket.

The clutch piston of the clutch assembly is resiliently biased into a released position. In a most preferred form of the invention, a spring resiliently urges the piston of the clutch assembly toward a released position.

The annular ring that operably separates or divides the piston cavity or pocket into inner and outer radially spaced chambers is preferably formed of an elastomeric material. Forming the ring or bumper from an elastomeric material enhances the ability of opposite side edges of the annular ring seal against the piston and the drive member of the clutch assembly as long as the clutch piston is in a released position.

The piston of the clutch assembly also comprises inner and outer elastomeric annular seals. The inner seal combines with the shaft about and along which the clutch piston moves to seal an inner edge of the cavity of the piston cavity. The outer seal combines with the piston and the drive member or clutch housing to seal an outer edge of the piston cavity. In a most preferred form of the invention, the annular ring that separates the piston cavity into inner and outer radially spaced chambers is integrally formed with the inner and outer seals on the piston of the clutch assembly.

In a preferred embodiment, the improved clutch assembly of the present invention is embodied in combination with a transmission having first and second gear meshes for establishing different drive gear ratio combinations for the transmission. The first and second gear meshes are included as part of a section of a multi-speed/multi-range transmission assembly for an off-highway implement. Each gear mesh includes a series of constant intermeshing gears. The first gear mesh includes a drive gear mounted for conjoint rotation with a rotating shaft defining an elongated axis. The second gear mesh includes a drive gear mounted for rotation about the axis and relative to the shaft. The fluid actuated clutch assembly of the present invention is interposed between the drive and driven gears of the first and second gear meshes for selectively establishing the drive connection therebetween.

In another preferred embodiment, the clutch piston of the clutch assembly carries therewith structure for allowing residual fluid to be released from the outer chamber of the clutch cavity or pocket in response to rotation of the drive gear following engagement of the drive connection between the gears. In a most preferred form of the invention, the fluid releasing structure comprises a valve arranged toward the outer diameter of the piston.

According to the present invention, the annular ring or bumper disposed in the piston cavity of the clutch assembly operably decreases the outside diameter of the piston cavity to an extent whereby eliminating concerns relating to inadvertent self-energizing the clutch assembly resulting from centrifugal pressure or centrifugal head force in the piston cavity. When the clutch assembly of the present invention is to be energized to establish a drive connection between the drive and driven members, pressurized fluid is introduced to the cavity thereby displacing the clutch piston from its released position. Upon displacement of the clutch piston from the released position, the annular ring or bumper has little or no effect on clutch operation and the torque capacity of the clutch assembly is not altered or changed.

The advantages of the present invention are readily apparent especially in those hydraulically actuated clutch assembly embodiments wherein an orifice or valve structure is arranged in combination with the clutch piston. In this regard, the orifice or valve structure normally allows residual fluid from the piston cavity thereby reducing the effect of centrifugal head force in the piston cavity or pocket. Because the annular seal or ring of the present invention seals between the clutch piston and drive member, the inner chamber of the piston cavity or pocket is sealed from the conventional orifice or valve structure arranged in operable combination with the outer chamber of the clutch cavity or pocket. Accordingly, the residual hydraulic fluid remaining in the supply conduit leading to the inner chamber of the piston .cavity is likewise inhibited from being exhausted through the orifice or valve structure. Maintaining the presence of hydraulic fluid in the supply line and in the inner chamber of the piston cavity diminishes the variability of clutch fill time and thus promotes consistent shifting of the transmission between gear ratios. With the annular bumper remaining in place as long as the clutch piston remains in a released position, pressurized fluid will remain in the fluid supply line and the inner chamber of the piston cavity of the clutch assembly notwithstanding the duration of time between shifts of the transmission, thus yielding consistent transmission operation and a smoother and more comfortable ride for the operator.

Numerous other features and advantages of the present invention will become readily apparent in the following detailed description, the appended claims, and the accompanying drawings.

DETAILED DESCRIPTION OF THE PRESENT INVENTION

While the present invention is susceptible of embodiment and various forms, there is shown in the drawings and will hereinafter be described, preferred embodiment of the invention; with the understanding that the present disclosure is to be considered as an exemplification of the invention and is not intended to limit the invention to the specific embodiment illustrated.

Figure 1:
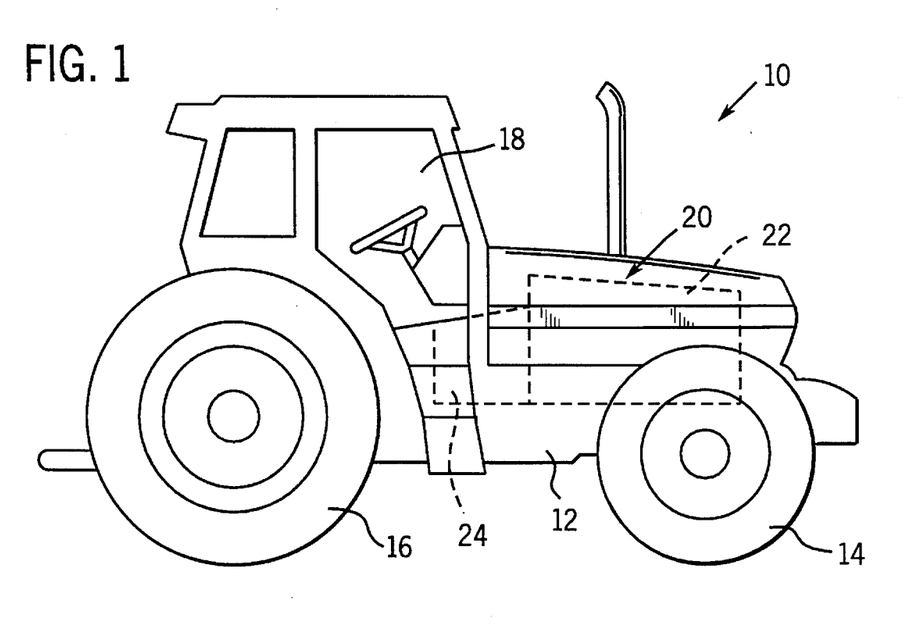
FIG. 1 is a schematic side elevational view of off-highway equipment in which the present invention may be embodied.

Referring now to the drawings, wherein like reference numerals refer to like parts throughout the several views, the transmission assembly of the present invention is preferably embodied as part of the serf-propelled off-highway equipment such as an agricultural tractor or the like, generally represented by reference numeral 10. It should be appreciated, however, that the broadest teachings of the present invention equally apply to clutch assemblies that are used in other than off-highway machines or implements.

Suffice it to say, the implement 10 includes a fore-and-aft frame 12 which, in the illustrated embodiment of the invention, is supported on a front pair of wheels 14 and a rear pair of wheels 16. The frame 12 preferably supports a body including an enclosed operator station or cab region 18 wherein the operator is positioned during operation of the implement to control various functions of the equipment. Equipment 10 further includes a power train 20 including a self-propelled engine 22 and transmission assembly 24 mounted on the frame 12.

Figure 2:
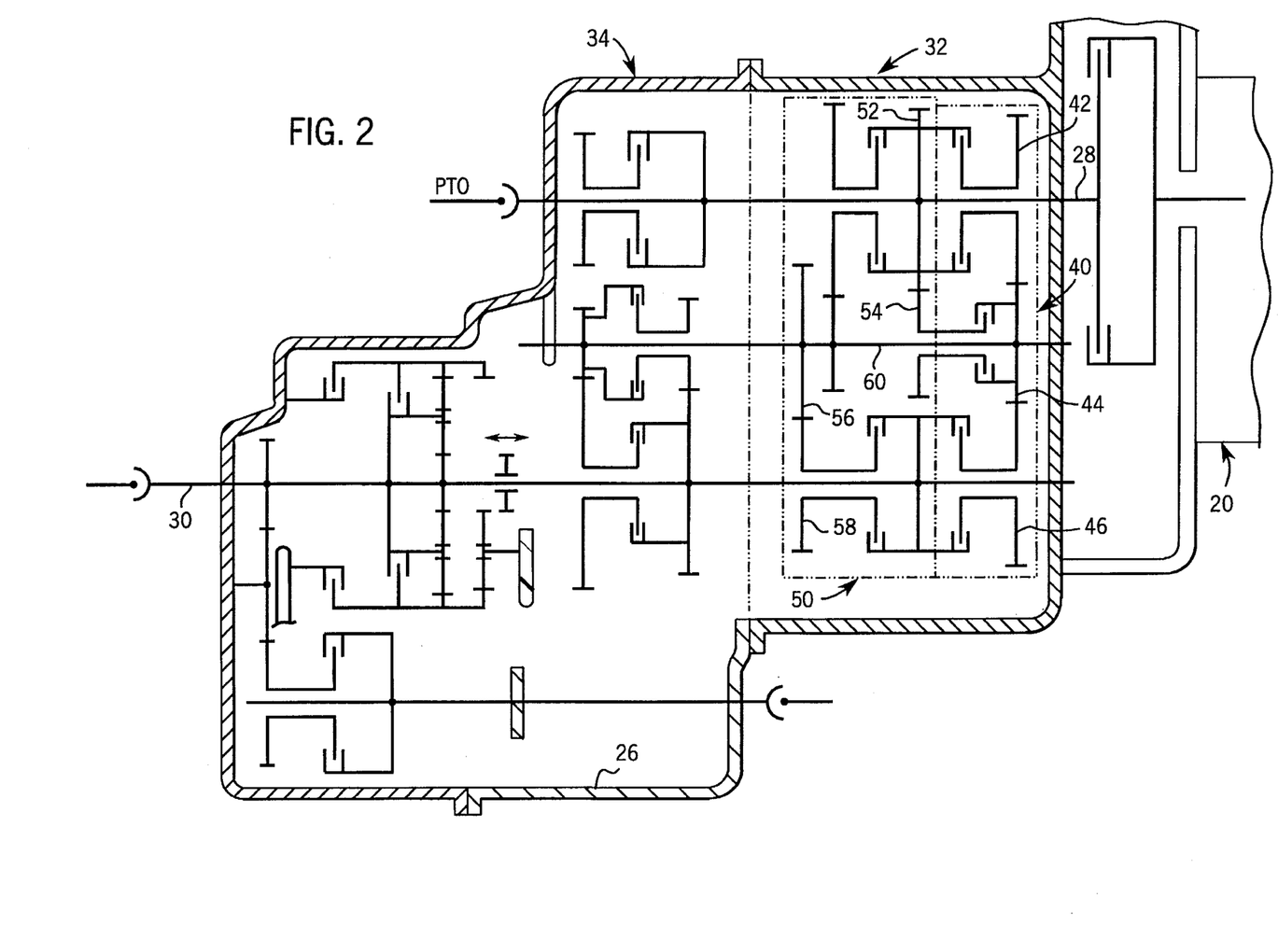
FIG. 2 is a diagrammatic developed but substantially side elevational view of a transmission for equipment illustrated in FIG. 1 and embodying principles of the present invention.

The transmission assembly 24 is schematically represented in its entirety in FIG. 2. The transmission assembly 24 includes a casing or housing 26 in which a plurality of various gear meshes are arranged for establishing different speed ratios between input and output shafts 28 and 30, respectively, of the transmission. In the illustrated embodiment, the transmission assembly 24 is divided into a multi-speed transmission section 32 and multi-range transmission section 34. Again, it should be appreciated that the broadest teachings of the present invention apply to both the illustrated form of the invention as well as other types of transmissions that may not necessary include speed and range transmission sections.

As shown, the multi-speed transmission section 32 includes at least two gear meshes 40 and 50 for establishing different drive ratio combinations between the input and output shafts 28 and 30, respectively, of the transmission. As shown, gear mesh 40 includes a series of constant intermeshing gears or components 42, 44 and 46. As shown, gear mesh 50 likewise includes a series of constant intermeshing gears or components 52, 54, 56 and 58. Moreover, and as illustrated, each gear mesh 40 and 50 includes one or more clutch assemblies for selectively establishing a drive connection between various rotatable components of the gear meshes 40 and 50.

A clutch assembly embodying teachings and principals of the present invention is operably disposed or arranged between the rotatable components 44 and 54 of the gear meshes 40 and 50, respectively. It should be further appreciated and understood, however, that other clutch assemblies disposed throughout the transmission assembly 24 may be similarly constructed.

Figure 3:
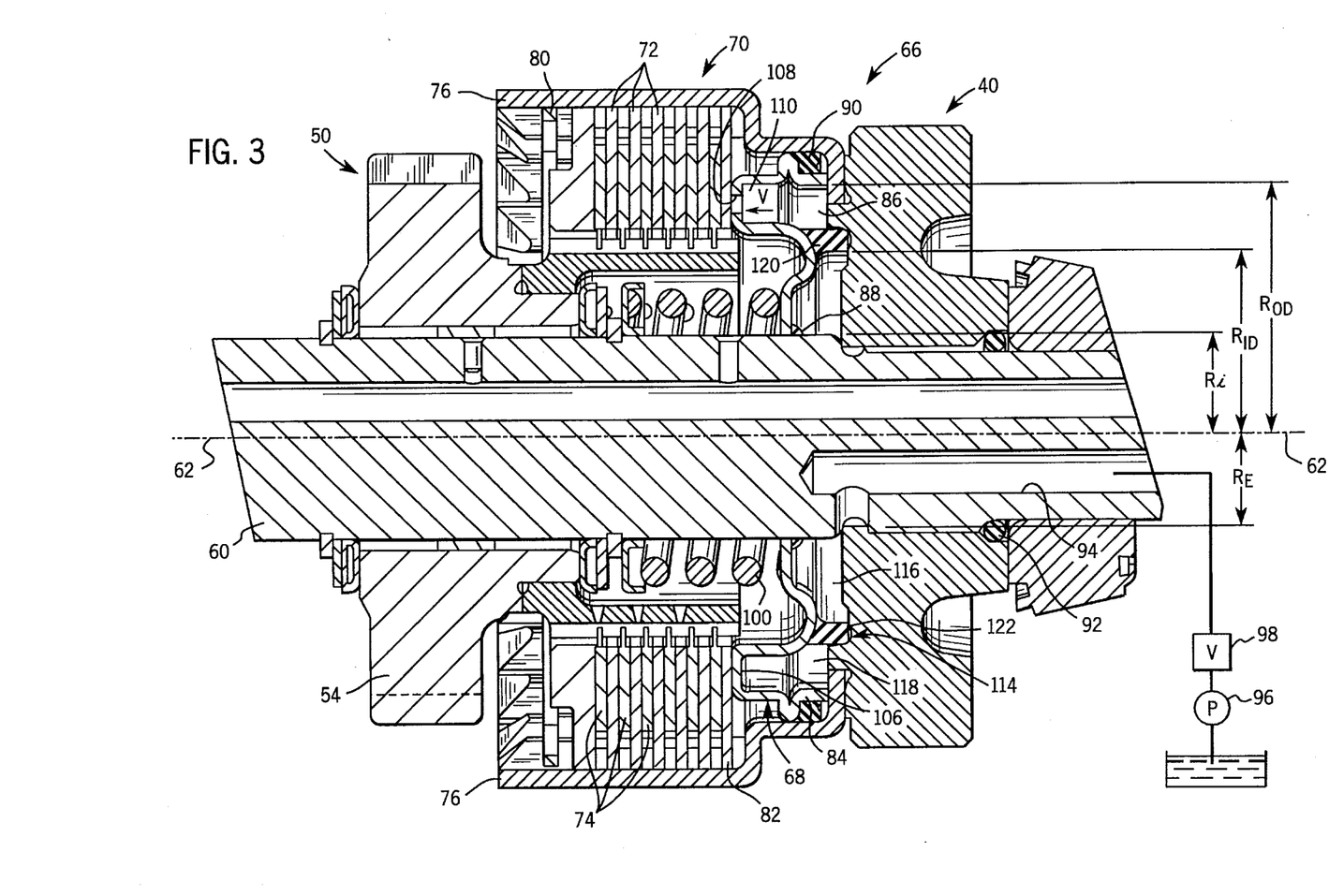
FIG. 3 is a longitudinal sectional view of a clutch assembly embodying principles of the present invention.

Turning now to FIG. 3, an exemplary embodiment of the present invention is schematically illustrated. As shown, gears 44 and 54 of gear meshes 40 and 50, respectively, are mounted in axial alignment relative to each other and on a rotatable shaft 60 defining a common elongated axis 62. Gear 44 is suitably affixed to rotate with shaft 60 and comprises a drive component. Gear 54 is mounted for rotation about the exterior of shaft 60 and comprises a driven component.

In accordance with the present invention, a fluid actuated clutch assembly 66 is operably interposed between the drive and driven components 44 and 54 of the gear meshes 40 and 50, respectively, for selectively establishing a drive connection between the drive and driven components 44 and 54. The clutch assembly 66 includes an actuator assembly 68 arranged in operable combination with a clutch pack 70 comprised of a plurality of friction members or plates 72 interleaved with a plurality of separators 74 for transferring rotatory power from the drive component 44 to the driven component 54 in response to the actuator assembly 68 applying a compressive force upon the clutch pack 70.

In the illustrated form of the invention, a conventional open-ended cylindrically shaped and suitably splined clutch housing 76 is carded by and for rotation with the drive component 44. As shown, the annular friction plates or disks 72 rotate with the clutch housing 76 and drive component 44. The annular separators or disks 74 rotate with the driven member 54. An annular stop plate 80 is affixed to the clutch housing at one end of the clutch pack 70. A reaction plate 82 is arranged at the opposite end of the clutch pack 70.

The actuator assembly 68 comprises a piston 84 fluid tightly sealed relative to shaft 60 for axial movement from a released position (shown in FIG. 3) toward the clutch pack 70. In the illustrated embodiment, piston 84 operably combines with the clutch housing 76 and the drive component 44 to define an expandable fluid receiving piston cavity or pocket 86. In the illustrated form of the invention, piston 84 comprises an annular inner seal 88 that fluid tightly and slidably seals the piston 84 to shaft 60. Piston 84 further includes an annular outer seal 90 that fluid tightly seals the piston 84 to the clutch housing 76. As shown, the drive member or component 44 likewise includes an annular seal or O-ring 92 for preventing fluid from escaping the piston cavity or pocket 86 between the drive component 44 and the exterior diameter of shaft 60. As is well known in the art, each seal 88, 90 and 92 is preferably formed from a suitable elastomeric material.

A fluid conduit 94 directs pressurized fluid to the cavity or pocket 86 thereby selectively controlling operation of the clutch assembly 66. As is well known in the art, the fluid conduit 94 is preferably formed as an axially elongated bore in shaft 60. As shown, bore 94 opens to the pocket or cavity 86 of the clutch assembly 66. In the illustrated embodiment, the fluid conduit 94 receives pressurized fluid from a source of pressurized fluid such as a pump 96 arranged on the equipment 10. A conventional operator controlled valve 98 is operably interposed between pump 96 and conduit 94 for selectively controlling operation of the clutch assembly 66.

In a preferred form of the invention, piston 84 of the actuating assembly 68 is normally biased into a released position such that a control signal, such as pressurized fluid from pump 96, is required to actuate the clutch assembly 66. In the illustrated embodiment, a spring 100 engages and normally biases the piston 84 into a released position.

In the illustrated embodiment of the invention, piston 84 includes a hollow generally cylindrically shaped axial projection defining an annular clutch pack engaging surface 106 preferably arranged toward the outer diameter of the piston 84. When the piston cavity or pocket 86 is pressurized, the piston 84 axially moves along shaft 60 to the left, as seen in FIG. 3, and the clutch pack engaging surface 106 engages the reaction plate 82 and applies a compressive force against the clutch pack 70.

In the illustrated form of the invention, and as illustrated in FIG. 3, piston 84 further includes a fluid flow passage 108 for allowing fluid to escape from the piston cavity 86, as long as the clutch piston 84 is in a released position, thereby reducing residual centrifugal pressure or centrifugal head force in the piston chamber 86. In a most preferred form of the invention, a fluid flow valve 110 is arranged in combination with the passage 108 for controlling the discharge of fluid from the piston cavity 84 in response to rotation of the drive component 44 following release of the clutch assembly 66 and disengagement of the drive connection between the drive and driven components 44 and 54. The fluid-flow valve 110 may be of the type sold by Acadia Company of Roanoke, Va. 24012 under Model No. N2-93081.

As discussed above, residual centrifugal pressure or centrifugal. head force in the piston chamber or pocket 86, under certain operating conditions, can cause inadvertent self-energization of the clutch assembly 66. The centrifugal head force in the piston cavity or pocket 86 can be calculated from the following equation:

$$F_{Cent.head} = c\gamma N^2 \times [R_{OD}^4 - 2R_E^2 (R_{OD}^2 R_i^2) - R_i^4]$$

and where:
c=a constant coefficient
γ=specific weight of hydraulic transmission fluid
N=rotational speed of drive component
$R_{OD}$=radius to outside diameter of clutch piston (FIG. 3)
$R_E$=radius to entry port for hydraulic fluid (FIG. 3)
$R_i$=radius to inside diameter of clutch piston (FIG. 3).

A salient feature of the present invention relates to an annular ring or bumper 114 for operably dividing the piston cavity 86 into inner and outer chambers 116 and 118, respectively, disposed different radial distances from the axis 62 as long as the clutch piston 84 remains in a released position. As shown in FIG. 3, the fluid passage or conduit 94 for directing pressurized fluid to the piston cavity 86 opens to the inner chamber 116. As will be appreciated from an understanding of the present invention, the clutch assembly 66 can include more than one annular ring or bumper disposed at different radial distances from the axis 62 if required without detracting or departing from the spirit and scope of the present invention. Preferably, each ring or bumper 114 is disposed concentrically about axis 62.

As shown in FIG. 3, the annular ring or bumper 114 has an axially elongated configuration with opposite side edges 120 and 122 arranged in sealing engagement with piston 84 and drive member 44, respectively, as long as clutch piston 84 remains in a released position. In the illustrated embodiment, the annular ring or bumper 114 moves with and in response to axial displacement of the clutch piston 84. It should be appreciated, however, that without incurring significant redesign, the ring or bumper 114 could extend axially from the drive member 44. Alternatively, an annular ring portion could axially extend from each of the drive and member 44 and the clutch piston 84 and sealingly join therebetween when the clutch piston 84 is in a released position.

In a preferred form of the invention and to enhance its sealing capability with piston 84 and drive member 44, the annular ring or bumper 114 is formed from an elastomeric material. In a most preferred form of the invention, and to facilitate assembly and fabrication of the clutch piston 84, the annular ring 114 is formed or molded integrally with the annular inner and outer piston seals 88 and 90 on the clutch piston 94.

During operation of the transmission 24, the annular ring 114 substantially eliminates residual centrifugal pressure or centrifugal head force in the piston chamber 86 thereby facilitating the force of spring 100 in maintaining piston 84 in a released position and thereby preventing inadvertent self-energization of the clutch assembly 66. In effect, and with the clutch piston 84 in a released position, the annular ring 114 decreases the operable outside diameter of the piston cavity 86 from its original size to the annulus size of the bumper 114 to practically eliminate centrifugal head force in the piston cavity 86. When compared with that above, the equation below further illustrates how the provision of bumper 114 reduces and substantially eliminates centrifugal head force in the piston cavity:

$$F_{Cent.head} = c\gamma N^2 \times [R_{ID}^4 - 2R_E^2(R_{ID}^2 - R_i^2) - R_i^4]$$

and where:

c=a constant coefficient
γ=specific weight of hydraulic transmission fluid
N=rotational speed of drive component
$R_{ID}$=radius to inside diameter of bumper (FIG. 3)
$R_E$=radius to entry port for hydraulic fluid (FIG. 3)
$R_i$=radius to inside diameter of clutch piston (FIG. 3).

Notably, and as shown in FIG. 3, $R_{ID}$ is smaller than $R_{OD}$. Thus, and although in the above formula $R_{ID}$ is taken to a fourth power, the centrifugal head force in the piston cavity 86 will be substantially decreased if not eliminated when the bumper 114 is provided to seal or operably divide the piston cavity 86 into inner and outer chambers 114 and 116, respectively, disposed at different radial distances from the axis of rotation 62 about which they are concentrically disposed.

As will be appreciated, with the clutch piston 84 in a released position, as shown in FIG. 3, the outer chamber 118 of the clutch pocket or cavity 86 is operably sealed from the inner chamber 116 and from the fluid source. Moreover, residual fluid in the outer chamber 118 of the piston cavity 86 is normally exhausted through the passage 108 and valve 110. Accordingly, residual transmission fluid entrapped in chamber 118, following the return of the clutch piston 84 to a released position, will have a substantially insignificant effect on the clutch piston 84. Because the outer chamber 118 is sealed from the fluid source, even the presence of residual fluid in the outer chamber 118 will not generate a substantial centrifugal head force on the clutch piston 84.

When the clutch assembly 66 is to be engaged, the annular ring or bumper 114 will not affect or detract from the responsiveness of the clutch assembly 66 in establishing a drive connection between the drive and driven members 44 and 54, respectively. That is, when a fluid pressure signal from the control valve 98 diverts hydraulic pressure to the piston cavity 86, the clutch piston 84 will function in a normal fashion. The reasons that the clutch piston 84 functions in a normal fashion notwithstanding the presence of the annular ring 114 is because the pressurized fluid delivered from valve 98 will effect the projected area of the piston 84 exposed to the inner chamber 116 which is significantly greater than the projected area on the bumper 114. Accordingly, as the pressure in piston cavity 86 increases, the piston axially moves against the action of spring 100 and towards the clutch pack 70. After the piston 84 axially moves, pressurized hydraulic fluid is permitted to the bypass the bumper 114 and be applied to the total projected area of the piston 84. Thus, the torque capacity of the clutch assembly 66 will not change.

The annular member or centrifugal force protector 114 furthermore serves to decrease variability of the time required to fill the piston cavity 86 with pressurized hydraulic fluid. As mentioned above, the transmission 24 may be conditioned to operate in a specific gear ratio for an extended period of time. Accordingly, and in the illustrated example, drive member 44 may be rotated for a significant time without clutch assembly 66 being engaged. Normally, valve 110 would tend to exhaust residual hydraulic fluid both from the piston cavity 86 and, because of the continuous rotation of the drive member 44, from a lengthwise portion of the fluid passage or conduit 94 leading an opening to piston cavity 86. Upon energization of the clutch assembly, and depending upon the amount of residual hydraulic fluid drained from the passage 94, the amount of time required to completely fill the piston cavity 86 would vary thus adversely affecting shift performance of the transmission.

With the present invention, however, and as long as the clutch piston 84 is in a released condition, the annular bumper 114 seals the inner chamber 116 from the outer chamber 118. Furthermore, with the clutch piston 84 in a released condition, the annular ring 114 seals the inner chamber 116 from the valve 110. Thus, residual hydraulic fluid in the inner chamber 116 and residual hydraulic fluid present in the line or conduit 94 will not be able to drain therefrom not withstanding the length of time the drive member 44 rotates without clutch assembly 66 being engaged. Accordingly, the annular ring 114 serves to decrease variability in the time required to fill the clutch piston cavity 86 upon actuation of the clutch assembly 66 thus providing for consistent transmission shift times and thereby enhancing smoother ride characteristics for the implement.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A transmission assembly for off-highway equipment, comprising:

first and second gear meshes for establishing different drive gear ratio combinations for the transmission, each gear mesh including a series of constant intermeshing gears, and wherein said first gear mesh includes a drive component mounted for conjoint rotation with a rotating shaft defining an elongated axis, and wherein said second gear mesh includes a driven component mounted for rotation about said axis and relative to said shaft; and a fluid actuated clutch assembly interposed between the drive and driven components of said first and second gear meshes for selectively establishing a drive connection between said drive and driven components of the first and second gear meshes respectively, said clutch assembly comprising an actuator assembly arranged in operable combination with a clutch pack of interleaved friction members for transferring rotary power from said drive component to said driven component in response to said actuator assembly applying a compressive force upon said clutch pack, said actuator assembly including a piston fluid tightly sealed relative to said shaft for axial movement from a released position toward the friction members, a clutch housing rotatable with said drive component and that is arranged in a fluid tight slidable sealed relationship with said piston to define an expandable fluid receiving pocket, a fluid passage defined by said shaft and opening from an exterior of said shaft to direct pressurized fluid to said pocket thereby moving said piston away from its released position and toward said clutch pack thereby conditioning said clutch assembly to releasably couple the drive and driven components to each other, and an annular ring for effectively dividing said pocket into inner and outer chambers disposed different radial distances from said axis, with said fluid passage opening to the inner chamber and with the piston having a valve arranged in operable association with the outer chamber of said pocket for exhausting residual fluid therefrom, and wherein opposite edges of said ring seal against said piston and the drive component as long as said piston remains in said released position thereby minimizing centrifugal head force applied to the piston as a result of rotation of the drive component after said clutch assembly is conditioned to uncouple the driven component from the drive component and for inhibiting fluid from draining from the fluid passage through the check valve thereby diminishing variability in the time required to fill the pocket with pressurized fluid.

2. The transmission assembly according to claim 1 wherein said clutch assembly further includes a spring for resiliently urging said piston toward said released position.

3. The transmission assembly according to claim 1 wherein said annular ring is formed from an elastomeric material to enhance its sealing capability at opposite edges thereof relative to said piston and the drive gear.

4. The transmission assembly according to claim 1 wherein said annular ring is formed from an elastomeric material and axially moves with the piston to open the entire pocket to fluid received from the fluid passage.

5. The transmission assembly according to claim 1 wherein said piston carries therewith inner and outer annular seals, with said annular ring being formed on said piston with said seals.

6. The transmission assembly according to claim 1 wherein the inner chamber of said pocket has a projected area that is greater than the projected area on said annular ring whereby said annular ring does not interfere with clutch assembly functional operation.

7. A transmission assembly for an off-highway implement, comprising:

first and second gear meshes for establishing different drive gear ratio combinations for the transmission, each gear mesh including a series of constant intermeshing gears, and wherein said first gear mesh includes a drive component mounted for conjoint rotation with a continuously rotatable shaft defining an elongated axis, and wherein said second gear mesh includes a driven component mounted for rotation about said axis and relative to said shaft; and a fluid actuated coupling arranged about said shaft and interposed between the drive and driven components of said first and second gear meshes for selectively establishing a drive connection between said drive and driven components of the first and second gear meshes respectively, said coupling comprising an actuator assembly arranged in operable combination with a clutch pack of interleaved friction members for transferring rotary power from said drive component to said driven component in response to said actuator assembly applying a compressive force upon said clutch pack, said actuator assembly including a piston arranged in operable combination with and establishing a fluid receiving pocket with said drive component, said piston being axially movable from a released position toward said clutch pack in response to the creation of fluid pressure in said pocket thereby conditioning said clutch pack to releasably couple the drive and driven components to each other, and an annular bumper for effectively dividing said pocket into inner and outer sealed chambers disposed different radial distances from said axis as long as said piston is in said released position thereby minimizing centrifugal head force applied to the piston as a result of rotation of said drive component following disengagement of the drive connection between the drive and driven components.

8. The transmission assembly according to claim 7 wherein said piston carries therewith structure for allowing fluid to be released from said outer chamber in response to rotation of said drive component following disengagement of the drive connection between said components.

9. The transmission assembly according to claim 8 wherein said fluid releasing structure comprises a valve arranged toward the outer diameter of said piston.

10. The transmission assembly according to claim 7 wherein said bumper comprises an elastomeric ring, said ring being axially elongated such that, with said piston in a released position, a first annular edge of said ring is arranged in sealing engagement with said piston and a second annular edge of said ring is arranged in sealing engagement with said drive component.

11. The transmission assembly according to claim 7 wherein said piston of said actuator assembly includes inner and outer annular seals, and wherein said bumper comprises an annular elastomeric ring that is formed on the clutch piston with said seals.

12. The transmission assembly according to claim 7 wherein said bumper is integrally formed as part of and moves with said piston.

13. The transmission assembly according to claim 7 wherein said first and second gear meshes define part of a multi-speed section of a multi-speed/multi-range transmission assembly for an off-highway implement.

14. The transmission assembly according to claim 7 wherein the inner chamber of said pocket defines a larger projected area than that on the bumper thereby said bumper does not interfere with operation of the fluid actuated coupling.

15. A power transfer assembly for establishing a drive connection between drive and driven members rotatably mounted about a common axis, said clutch assembly comprising:

an actuator assembly arranged in operable combination with a clutch pack of interleaved friction members for transferring rotary power between the drive and driven members in response to said actuator assembly applying a compressive force upon said clutch pack, said actuator assembly including a piston arranged in operable combination with and establishing a fluid receiving pocket with said drive member, said piston being axially movable from a released position toward said clutch pack in response to the creation of fluid pressure in said pocket thereby conditioning said clutch pack to establish the drive connection between the drive and driven members, and an annular ring disposed between said piston and said drive member for operably dividing said pocket into inner and outer chambers disposed different radial distances from said axis, with opposite edges of said ring being arranged in fluid tight sealing relation with the piston and drive member thereby maintaining said chambers in separate relation relative to each other as long as said piston is in said released position.

16. The power transfer assembly according to claim 15 wherein said piston of said actuator assembly includes a fluid flow passage leading from the outer chamber of the pocket to allow residual fluid to pass from the outer chamber in response to rotation of the, drive member and while said piston is in said released position.

17. The power transfer assembly according to claim 15 wherein said piston further includes valve structure arranged in operable association with the outer chamber of said pocket for allowing residual fluid to pass from the outer chamber in response to rotation of the drive member following said piston returning to said released position.

18. The power transfer assembly according to claim 15 further including a spring for automatically urging said piston toward said released position.

19. The power transfer assembly according to claim 15 wherein said annular ring moves with and in response to axial displacement of said piston.

20. The power transfer assembly according to claim 15 wherein said annular ring is formed from an elastomeric material and includes opposite edge portions that sealingly engage with the piston and the drive member as long as said piston is in said released position.

21. The power transfer assembly according to claim 15 further including inner and outer elastomeric seals arranged on said piston, and wherein said seals and said annular ring are conjointly formed on said piston.

22. A hydraulically actuated clutch assembly for establishing a drive connection between drive and driven members rotatably mounted about a common axis, said clutch assembly comprising:

an actuator assembly and a series of annular friction plates arranged along and about said axis, said friction plates being operative to transfer rotary power and torque in response to said actuator assembly applying a compressive force thereon, said actuator assembly including a piston arranged in a fluid tight slidable relation with said drive member and establishing a fluid receiving cavity therebetween, said piston being axially movable from a released position toward said friction plates in response to the creation of fluid pressure in said pocket thereby moving said friction plates into coupled relation to establish the drive connection between the drive and driven members, a spring for urging said piston away from the friction plates toward said released position when the fluid pressure in said pocket is less than a force developed by said spring, and an annular ring concentrically arranged about said axis and extending between said piston and said drive member for operably dividing said pocket into inner and outer chambers disposed different radial distances from said axis, and wherein opposite sides of said ring are maintained in fluid tight sealing relation relative to said piston and drive member as long as said piston remains in said released position thereby minimizing centrifugal head force applied to the piston as a result of rotation of said driven member.

23. The clutch assembly according to claim 22 wherein said drive member comprises a rotatably driven gear forming part of a gear mesh in a transmission assembly of an off-highway implement and a clutch housing connected to and rotatable with said gear.

24. The clutch assembly according to claim 22 wherein said piston includes a fluid flow passage leading from the outer chamber of the pocket to allow residual fluid to pass from the outer chamber in response to the of said drive member following said piston returning to said retracted position.

25. The clutch assembly according to claim 22 wherein said piston further includes structure carried by said piston and arranged in operable association with the outer chamber of said pocket for allowing fluid to pass from the outer chamber following said piston returning to said released position.

26. The clutch assembly according to claim 22 wherein said annular ring is formed from an elastomeric material to enhance the sealing capability of the sides of said ring relative to said piston and drive member.

27. The clutch assembly according to claim 22 wherein said annular ring moves axially with said piston.

28. A hydraulically actuated clutch assembly for establishing a drive connection between drive and driven members rotatably mounted about an elongated rotatable shaft defining a common axis for the drive and driven members, said clutch assembly comprising:

an actuator assembly and a series of interleaved friction plates operably arranged between said drive and driven members for transferring power therebetween in response to said actuator assembly applying an adequate compressive force against said plates, said actuator assembly including a piston fluid tightly sealed for axial sliding movement from a released position toward and away from said friction plates, and wherein said piston is fluid tightly sealed to a clutch housing rotatable with said driven member to define a fluid receiving pocket, a fluid passage opening to said pocket for fluid pressurizing said piston toward the friction plates thereby establishing the drive connection between said drive and driven members, and an annular member arranged about said axis and axially extending between said piston and said drive member for operatively dividing said pocket into inner and outer chambers defined different radial distances from said axis, with said annular member establishing a sealed relationship with said piston and said drive member as long as said piston remains in said released position, and wherein the inner sealed chamber of said pocket opens to the fluid passage, and wherein the annular member inhibits loss of residual fluid in the passage notwithstanding rotation of the drive member thereby maintaining substantially consistent operation of said clutch assembly notwithstanding the duration between establishment of the drive connection between the drive and driven members.

29. The clutch assembly according to claim 28 further including an inner elastomeric annular seal carded by said piston, an outer elastomeric seal carried by said piston, and wherein said annular member is carried by and formed on said piston with said inner and outer seals.

30. The clutch assembly according to claim 28 wherein said annular member comprises an elastomeric annular bumper carried by and that is arranged concentric with said piston.

31. The clutch assembly according to claim 28 wherein said piston defines a fluid passage allowing residual fluid to be exhausted from the outer chamber of the pocket upon rotation of said drive member when said piston is in said released position.

32. The clutch assembly according to claim 31 further including a fluid-flow valve arranged in the passage for controlling residual fluid flow from said outer chamber of said pocket.

* * * * *